United States Patent
Feeley

[11] Patent Number: 5,169,469
[45] Date of Patent: Dec. 8, 1992

[54] MAKING OF TRILAMINATES AND QUADLAMINATES FOR AUTOMOTIVE VEHICLE SEATS

[75] Inventor: George F. Feeley, Dowington, Pa.

[73] Assignee: Seton Company, Newark, N.J.

[21] Appl. No.: 547,961

[22] Filed: Jul. 5, 1990

[51] Int. Cl.$^5$ ............................................. B32B 31/00
[52] U.S. Cl. ..................... 156/241; 156/248; 156/289; 156/327; 156/331.7; 156/332; 156/344
[58] Field of Search .................. 156/60, 182, 247, 248, 156/250, 267, 305, 310, 289, 344, 93, 152, 230, 241, 332, 327, 331.7; 428/304.4, 316.6, 317.1, 317.7, 318.4, 319.9, 319.7, 319.3, 423.1, 423.3, 423.7, 424.8, 480, 500, 40-42

[56] References Cited

U.S. PATENT DOCUMENTS

| | | |
|---|---|---|
| 2,227,212 | 12/1940 | Beck . |
| 2,371,954 | 3/1945 | Cunningham .......................... 45/138 |
| 3,654,059 | 4/1972 | Zisblatt . |
| 4,514,869 | 5/1985 | Aoki et al. ............................. 5/472 |
| 4,557,774 | 12/1985 | Hoopengardner ..................... 156/71 |
| 4,627,660 | 12/1986 | Kon ....................................... 297/219 |
| 4,692,199 | 9/1987 | Kozlowski et al. .................. 156/245 |
| 4,722,760 | 2/1988 | Shimada ............................... 156/214 |
| 4,737,226 | 4/1988 | Inoue .................................... 156/245 |
| 4,797,170 | 1/1989 | Hoopengardner ..................... 156/71 |
| 4,799,988 | 1/1989 | Shimada ............................... 156/475 |
| 4,874,448 | 10/1989 | Urai ....................................... 156/196 |
| 4,900,377 | 2/1990 | Redford ............................... 156/251 X |
| 4,925,513 | 5/1990 | Witzke et al. ........................ 156/245 |
| 4,927,694 | 5/1990 | Matsuura et al. ................... 428/159 |
| 4,995,926 | 2/1991 | Urai ...................................... 156/245 X |

Primary Examiner—David A. Simmons
Assistant Examiner—Chester T. Barry
Attorney, Agent, or Firm—Webb, Burden, Ziesenheim & Webb

[57] ABSTRACT

A laminated composite in the form of a trilaminate and quadlaminate for use in the manufacture of a seat, particularly a vehicle seat, such as an automobile seat and a vehicle interior member. The laminated composite includes a seat cover material having a first adhesive applied to a first surface of the seat cover material. A sew pad is bonded to the seat cover material by the first adhesive. A second adhesive can be applied to the sew pad so that the sew pad can be bonded to a cushion by the second adhesive. The first adhesive can be a thermoplastic releasable polyolefin or polyester, and the second adhesive can be a polyurethane film so that the first adhesive forms a temporary releasable bond and the second adhesive forms a permanent bond. A method of manufacturing laminated composites is also disclosed.

7 Claims, 1 Drawing Sheet

MAKING OF TRILAMINATES AND QUADLAMINATES FOR AUTOMOTIVE VEHICLE SEATS

BACKGROUND OF THE INVENTION

1. Field of the Invention.

This invention relates generally to the manufacture of automotive interior members and vehicle seats, and more particularly to a method of attaching a seat cover to a seat cushion and to the laminated composites made thereby.

2. Description of the Prior Art

Presently, the manufacture of automotive interior members or vehicle seat covers and seats is a time consuming, labor intensive and expensive operation. In a typical method of manufacture, first a die-cut seat cover material 4 made of fabric or leather is matched and tack sewn to a corresponding die-cut low density polyurethane foam 6 by threads 8 to form a composite as shown in FIG. 1. In the case of seat covers, the tack sewn die-cut parts are then sewn together to form an entire seat cover. Finally, the seat cover is attached to a seat cushion either by mechanical fastening or adhesive bonding, such as the Sur-Bond ® method or methods described in U.S. Pat. Nos. 4,874,488; 4,799,988; 4,737,266; 4,722,760 and 4,692,199. Generally, benchtype automobile seat covers are mechanically fastened to the seat cushions and bucket-type seat covers are adhesively bonded to the seat cushions.

The adhesive bonding methods described in the cited patents require either that a liquid adhesive be applied to the sew pad or that a weld sheet be sandwiched between the sew pad and the fabric. Heat is then applied to the seat cover to activate the adhesive and bond the sew pad to the cushion cover. When liquid adhesive is used, it must be applied to the sew pad at the seat fabrication site. This is cumbersome and time consuming. Often the liquid adhesive is not applied uniformly to the sew pad and this can result in an inferior bond between the sew pad and the cushion. The liquid adhesive also creates an environmental problem for seat fabricators due to the presence of solvents and other chemicals in the adhesive. Weld sheets are difficult to hold in place and to properly position. Additionally, all conventional bonding methods require the application of heat and/or steam to the seat cover to activate the adhesives. At times the heat can damage the cover material, especially leather, resulting in a high seat rejection rate.

Further, the rejection rate is high, not only due to heat damage to the seat cover during the bonding process and inferior bonding of the sew pad to the cushion, but also because of other factors, such as mismatched sew pads and cover material, improperly sewn seat covers, improperly die-cut seat cover material and/or sew pads and damage to the cover material from liquid adhesive material spilled thereon. Thus, seat cover manufacturers and automobile seat manufacturers must carry additional inventory to cover rejections and this results in additional manufacturing costs.

Therefore, it is an object of the present invention to limit the required inventory a seat fabricator must carry so that the fabricator need not stock both sew pad and seat cover material to be matched together. It is a further object of the invention to decrease the labor required to fabricate automotive seats. It is a further object of the invention to eliminate waste due to improper tack sewing. It is a further object of the invention to manufacture a seat cover which is the same as present seat covers but at a lower cost. It is yet a further object of the invention to eliminate the need to spray liquid adhesives onto the sew pad at the fabrication site. It is a further object of the invention to ensure that a uniform bond occurs between the sew pad and the seat cushion. And it is yet a further object of the present invention to eliminate the need for pollution control equipment at the manufacturing site of a seat cushion.

SUMMARY OF THE INVENTION

My invention is a laminated composite for use in the manufacture of a seat which includes a seat cover material having an inner surface and an outer surface, and a first adhesive applied to the inner surface of the seat material. A sew pad having a first side and a second side has its first side bonded to the inner surface of the seat cover material by the first adhesive. The seat cover material can include leather, fabric or polymeric material. The first adhesive can be heat-fusable, such as a thermoplastic releasable polyolefin or polyester, and the sew pad can be a non-woven material, such as a low density polyurethane foam having a scrim forming to the second side. A second adhesive can be applied to the second side of the sew pad for attaching to a seat cushion. The second adhesive can be a heat activated adhesive, such as a thermoplastic polyurethane film. The second side of the sew pad can be permanently bonded to the seat cushion by the second adhesive. Preferably, the second adhesive is heat activated and has an activation temperature below the degradation temperature of the first adhesive, the seat cushion and the seat cover material. This activation temperature can between 80-90 degrees Celsius. Preferably, the first adhesive temporarily and releasably bonds the seat material to the sew pad and the second adhesive permanently bonds the sew pad to the cushion.

My invention further includes a method of manufacturing a laminated composite including providing a seat cover material having an inner surface and an outer surface, and applying a first adhesive to an inner surface of the seat cover material. The method can further include bonding a first side of a sew pad to the inner surface of the seat cover material by the first adhesive to form a trilaminate structure. Further, the method can include cutting the trilaminate structure for use in manufacturing a seat cover. The method can further include attaching the cut trilaminates together to form a seat cover and attaching the seat cover to a seat cushion. Additionally, the method can include applying a second adhesive to a second side of the sew pad to form a quadlaminate structure and, further, bonding a seat cushion to the sew pad with the second adhesive. Furthermore, the method can include placing the quadlaminate with the second adhesive against the seat cushion, heating the second adhesive to an activation temperature which is below the degradation temperature of the seat cover, the first adhesive and the seat cushion and bonding the seat cushion to the sew pad. The first adhesive bond can be a temporary releasable bond and the second adhesive bond can be a permanent bond, such that the method can further include breaking the temporary bond between the seat cushion and the sew pad. The first adhesive can be a heat-fusable thermoplastic releasable polyolefin or polyester film and the second adhesive can be a thermoplastic polyurethane film.

My invention further includes a laminated composite for use in the manufacture of a vehicle interior member and includes a cover material having an inner surface and an outer surface, a first adhesive applied to the inner surface of the cover material and a sew pad having a first side and a second side. The first side of the sew pad is bonded to the inner surface of the cover material by the first adhesive. The first adhesive can be heat-fusable and can be a thermoplastic releasable polyolefin or a polyester. The laminate can further include a second adhesive applied to the second side of the sew pad. The second adhesive can be a heat-activated thermoplastic polyurethane film. A base can be attached to the sew pad by bonding to the second side of the sew pad by the second adhesive.

Furthermore, my invention includes a method of manufacturing a laminated composite for a vehicle interior member which includes providing a cover material having an inner surface and an outer surface, applying a first adhesive to the inner surface of the cover material, and bonding a first side of a sew pad to the inner surface of the cover material by the first adhesive to form a trilaminate structure. The method can further include applying a second adhesive to a second side of the sew pad and forming a second adhesive coating, and bonding a base to the sew pad by the second adhesive.

DETAILED DESCRIPTION OF THE PREFERRED EMBODIMENTS

Figure 1:
FIG. 1 shows a cross-sectional view of a seat cover including a sew pad tack sewn to a seat cover material made in accordance with the prior art.
Figure 2:
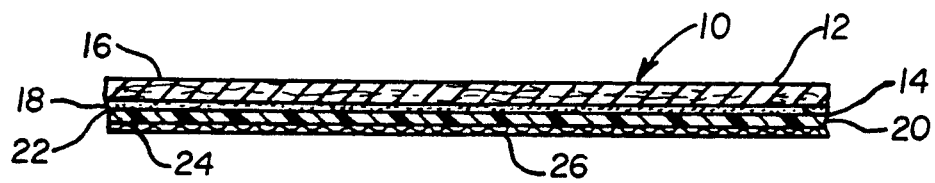
FIG. 2 shows a cross-sectional view of a trilaminate structure made in accordance with the present invention.

A laminated composite, in the form of a trilaminate 10 made in accordance with the present invention, is shown in FIG. 2. The trilaminate 10 includes a seat cover material 12, such as leather, fabric or polymeric material, having an inner surface 14 and an outer surface 16.

The trilaminate 10 further includes a first adhesive 18 applied to the inner surface 14 of the seat cover material 12 and a sew pad 20 having a first side 22 and a second side 24. The first side 22 of the sew pad 20 is bonded to the inner surface 14 of the seat cover material 12 by the first adhesive 18.

The sew pad 20 preferably comprises a low density polyurethane foam or other non-woven material having a scrim 26 attached thereto. The scrim 26 forms the second side 24 of the sew pad 20.

The first adhesive 18 preferably is heat-fusable material such as a thermoplastic polyolefin film or a polyester film. In some applications, such as material used on the portion of the seat which is a person's buttocks, the first adhesive 18 can be a releasable adhesive that temporarily bonds the seat cover material 12 to the sew pad 20 so that the bond can be broken to allow movement between the two substrates. In other applications, such as the portion of the seat supporting a person's back, the first adhesive 18 permanently bonds the seat cover material 12 to the sew pad 20. The trilaminate 10 can be manufactured using state of the art coating technology.

Figure 3:
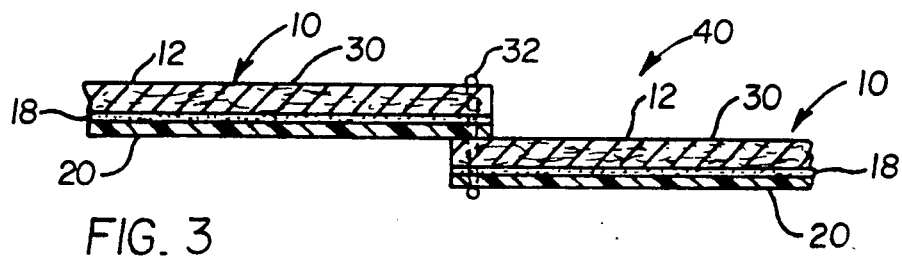
FIG. 3 shows a cross-sectional view of two die-cut trilaminates sewn together.

To manufacture a seat cover 40, as shown in FIG. 3, the trilaminate 10 is then cut, usually by die-cutting, into seat cover sections 30 which are machine sewn together by threads 32 which pass through the respective cover material and sew pads to form the seat cover 40. The seat covers can then be mechanically attached, as is well known in the art, or adhesively bonded to a seat cushion to form an automobile seat. The present method of manufacturing a trilaminate 10 thus automates the labor intensive procedure of tack sewing the sew pad 20 to the seat cover material 12. Further, the fabrication of the trilaminate 10 eliminates the need of separately die-cutting the sew pad 20 and the seat cover material 12 and the costs associated therewith, for example, due to mismatching, high rejection rates and increased inventory costs because both parts are die-cut subsequent to their being bonded.

It should be noted that the trilaminate 10 need not be limited to seat covers. The seat cover material 12 can be any cover material used on the interior of a vehicle and can be used for covering vehicle door panels, vehicle glove box covers and vehicle gear box covers for example.

As stated hereinbefore, several problems are associated with prior adhesive bonding methods. A laminated composite, in the form of a quadlaminate 50 according to a second embodiment of my invention shown in FIGS. 4-6, overcomes these problems.

Figure 4:
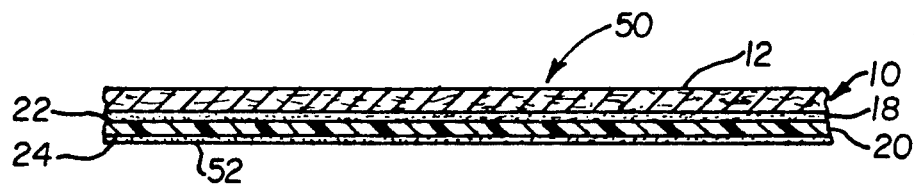
FIG. 4 shows a cross-sectional view of a quadlaminate structure made in accordance with the present invention.

FIG. 4 shows a quadlaminate 50 for attaching the seat cover to the seat cushion. The quadlaminate 50 includes a laminated composite, such as a trilaminate 10, and further includes a second adhesive 52 applied to a second side 24 of a sew pad 20 and forming a second adhesive coating. Preferably the second adhesive is a heat activated adhesive, such as a polyurethane film, which has an activation temperature below the degradation temperature of cover material 12, first adhesive 18 and sew pad 20. The second adhesive 52 permanently bonds the sew pad 20 to the seat cushion when activated. Preferably, the activation temperature should be less than 90 degrees Celsius and more preferably between 80-90 degrees Celsius. Like the trilaminate 10, the quadlaminate 50 can be die-cut into seat cover sections which are then sewn together to form a seat cover, and the second adhesive coating 52 can be applied to the sew pad 20 using state of the art coating technology. As in the case with the trilaminate 10, the quadlaminate 50 can be used to attach other vehicle interior members to a surface. Such members include, but are not limited to, door panels, glove box covers and gear box covers.

Figure 5:
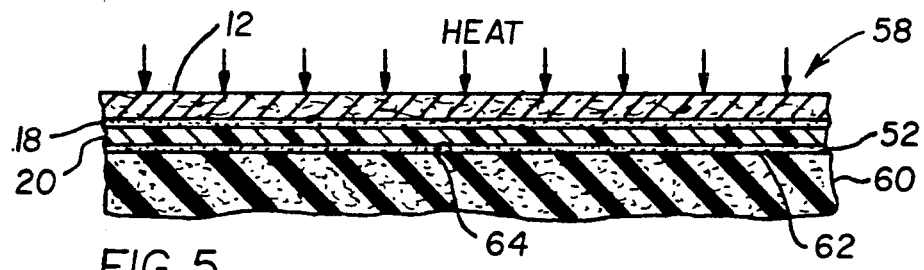
FIG. 5 shows a cross-sectional view of the quadlaminate structure of FIG. 4 bonded to a seat cushion made in accordance with the present invention.

FIG. 5 shows a portion of a seat cover 58 made from the quadlaminate 50 placed against a seat cushion or base 60 so that a face 62 of the second adhesive 52 abuts an upper surface 64 of the seat cushion 60. Heat at a temperature sufficient to activate the second adhesive 52 and below the degradation temperature of the seat cover material 12, first adhesive 18, the sew pad 20 and the seat cushion 60 is then applied to the outer surface 16 of the seat cover material 12 until the second adhesive 52 permanently bonds the sew pad 20 to the seat cushion 60. The heat can be supplied in any manner such as by a heating iron or by steam as is known in the art. When bonding the quadlaminate 50 to a base of another vehicle interior member, the base may be a cushion or other material such as metal, or plastic, or wood, for example.

Figure 6:
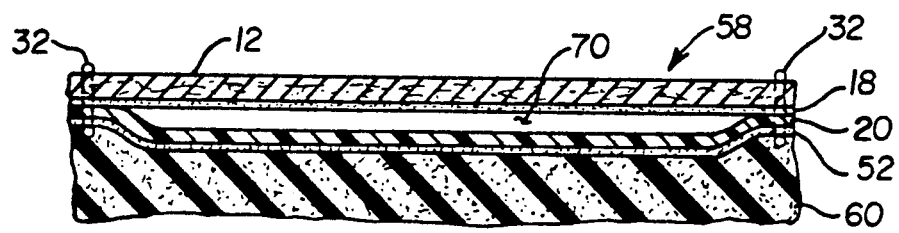
FIG. 6 shows a cross-sectional view of a seat made in accordance with the present invention wherein a releasable temporary bond between the seat cover and the sew pad has been broken.

When it is required that the seat cover 58 give the appearance of being tack sewn on the sew pad subsequent to bonding the sew pad 20 to the seat cushion 60, the temporary bond between the seat cover material 12 and the sew pad 20 is broken by pulling the seat cover 58 away from the sew pad and forming a gap 70 intermediate of the seat cover material 12 and sew pad 20, as shown in FIG. 6. The seat cover 58 is held in place by the threads 32 used to attach the seat cover sections 30 which pass through the seat cover material 12 and the sew pad 20.

Manufacturing seat covers and seats in the manner described herein requires less inventory, results in fewer rejections and is less labor intensive than making seat covers by tack sewing. This results in a less expensive seat cover. The quadlaminate 50 eliminates the need to spray liquid adhesives at the fabrication site or the use of an additional weld sheet to bond the sew pads to the seat cushion since the second adhesive 52 is applied to the trilaminate 10 prior to fabrication of the seat cover 40. This eliminates the need for pollution control equipment, special chemical handling and storage facilities for the adhesives at the fabrication site.

Having described presently preferred embodiments of the invention, it is to be understood that it may otherwise be embodied within the scope of the appended claims.

I claim:

1. A method for manufacturing a seat cover comprising:
   providing a seat cover material having an inner surface and an outer surface;
   applying a releasable first adhesive to the inner surface of said seat cover material;
   bonding a first side of a sew pad to the inner surface of the seat cover material by said first adhesive thereby forming a trilaminate structure, the releasable first adhesive forming a temporary bond between the seat cover material and the sew pad;
   cutting the trilaminate structure into a seat cover section;
   attaching the seat cover section and other seat cover sections together, thereby forming a seat cover; and
   breaking the temporary bond between the seat cover material and said sew pad by pulling the seat cover away from the sew pad and forming a gap intermediate of the seat cover material and the sew pad.

2. A method of manufacturing a seat cover of claim 1 wherein the seat cover sections are attached together by sewing.

3. A method of manufacturing a laminated composite comprising the steps of:
   providing a seat cover material having an inner surface and an outer surface;
   applying a first releasable adhesive to the inner surface of said seat cover material;
   bonding a first side of a sew pad to said inner surface of said seat cover material by said first adhesive to form a trilaminate structure;
   applying a second adhesive to a second side of said sew pad and forming a second adhesive coating;
   bonding a seat cushion to said sew pad by said second adhesive; and
   placing said second adhesive against said seat cushion, heating said second adhesive to an activation temperature below the degradation temperature of said first adhesive and bonding said sew pad to said seat cushion with said second adhesive;
   wherein said first adhesive forms a temporary bond between said seat cushion and said sew pad and said second adhesive forms a permanent bond between said sew pad and said seat cushion, the method further comprising breaking the temporary bond between said seat cover and said sew pad after said sew pad is bonded to said cushion.

4. A method of claim 3 further comprising:
   cutting said trilaminate structure into a seat cover section for use in manufacturing a seat cover.

5. The method of claim 3 wherein said first adhesive is selected from the group consisting of a heat-fusible thermoplastic polyolefin and a heat-fusable polyester.

6. The method of claim 3 wherein said second adhesive comprises a thermoplastic polyurethane film.

7. The method of claim 3 further including attaching said trilaminates together to form a seat cover before attaching said seat cover to a seat cushion.

* * * * *